United States Patent
Zeng et al.

(10) Patent No.: US 7,779,001 B2
(45) Date of Patent: Aug. 17, 2010

(54) WEB PAGE RANKING WITH HIERARCHICAL CONSIDERATIONS

(75) Inventors: Hua-Jun Zeng, Beijing (CN); Zheng Chen, Beijing (CN); Benyu Zhang, Beijing (CN); Wei-Ying Ma, Beijing (CN); Guirong Xue, Beijing (CN)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 10/978,232

(22) Filed: Oct. 29, 2004

(65) Prior Publication Data

US 2006/0095430 A1    May 4, 2006

(51) Int. Cl.
G06F 17/30    (2006.01)
(52) U.S. Cl. .................................................... 707/726
(58) Field of Classification Search ................. 707/726
See application file for complete search history.

(56) References Cited

U.S. PATENT DOCUMENTS

| | | | | |
|---|---|---|---|---|
| 6,112,203 | A * | 8/2000 | Bharat et al. ................... | 707/5 |
| 6,553,364 | B1 * | 4/2003 | Wu ............................... | 707/1 |
| 6,615,209 | B1 * | 9/2003 | Gomes et al. .................. | 707/5 |
| 6,738,678 | B1 | 5/2004 | Bharat et al. | |
| 6,990,628 | B1 * | 1/2006 | Palmer et al. ............... | 715/234 |
| 7,089,252 | B2 * | 8/2006 | Tomlin et al. ............... | 707/101 |
| 7,194,454 | B2 * | 3/2007 | Hansen et al. ................. | 707/3 |
| 7,197,497 | B2 * | 3/2007 | Cossock ........................ | 707/7 |
| 7,251,654 | B2 * | 7/2007 | Eiron et al. .................... | 707/7 |
| 7,257,577 | B2 * | 8/2007 | Fagin et al. .................... | 707/7 |
| 7,260,573 | B1 * | 8/2007 | Jeh et al. ....................... | 707/7 |
| 7,376,643 | B2 * | 5/2008 | Zeng et al. ..................... | 707/3 |
| 7,499,965 | B1 * | 3/2009 | Chai ........................... | 709/202 |
| 2003/0014399 | A1 * | 1/2003 | Hansen et al. ................. | 707/3 |
| 2003/0204502 | A1 * | 10/2003 | Tomlin et al. .................. | 707/5 |
| 2004/0111412 | A1 | 6/2004 | Broder | |
| 2005/0060297 | A1 * | 3/2005 | Najork .......................... | 707/3 |
| 2005/0071328 | A1 * | 3/2005 | Lawrence ...................... | 707/3 |
| 2005/0086260 | A1 * | 4/2005 | Canright et al. .......... | 707/104.1 |
| 2005/0114324 | A1 * | 5/2005 | Mayer ........................... | 707/3 |
| 2005/0256833 | A1 * | 11/2005 | Zeng et al. ..................... | 707/1 |
| 2006/0294124 | A1 * | 12/2006 | Cho ............................ | 707/101 |
| 2009/0083314 | A1 * | 3/2009 | Maim ..................... | 707/103 R |

OTHER PUBLICATIONS

Xue-Mei Jiang et al., "Exploiting PageRank at Different Block Level" Lecture Notes in Computer Science, Web Information Systems—WISE 2004, vol. 3306/2004, pp. 241-252. Nov. 1, 2004.*

(Continued)

*Primary Examiner*—Neveen Abel Jalil
*Assistant Examiner*—Mark Andrew X Radtke (57) ABSTRACT

The described systems, methods and data structures are directed to ranking Web pages with hierarchical considerations. The hierarchical structures and the linking relationships of the World Wide Web are used to provide a page importance ranking for Web searches. The linking relationships are aggregated to a high level node at each of the hierarchical structures. A link graph analysis is performed on the aggregated linking relationships to determine the importance of each node. The importance of each node may be propagated to pages associated with that node. For each page, the importance of that page and the importance of the node associated with the page are used to calculate the page importance ranking.

23 Claims, 9 Drawing Sheets

OTHER PUBLICATIONS

Xue, G. et al. 2003. Implicit link analysis for small web search. In Proceedings of the 26th Annual international ACM SIGIR Conference on Research and Development in informaion Retrieval (Toronto, Canada, Jul. 28-Aug. 1, 2003). SIGIR '03. ACM Press, New York, NY, 56-63. DOI= http://doi.acm.org/10.1145/860435.860448.*

Xue, G. et al. User Access Patter Enhanced Small Web Search. WWW 2003, May 20-24, 2003. Budapest, Hungary.*

Krishna Bharat, Monika R. Henzinger, Improved Algorithms for Topic Distillation in a Hyperlinked Environment, SIGIR'98, Melbourne, Australia © 1998.

Soumen Chakrabarti, Byron Dom, Prabhakar Raghavan, Sridhar Rajagopalan, David Gibson, Jon Kleinberg, Automatic Resource Compilation by Analyzing Hyperlink Structure and Associated Text.

Soumen Chakrabarti, Integrating the Document Object Model with Hyperlinks for Enhanced Topic Distillation and Information Extraction, WWW10, May 1-5, 2001, Hong Kong, pp. 211-220.

Soumen Chakrabarti, Mukul Joshi, Vivek Tawde, Enhanced Topic Distillation using Text, Markup Tags, and Hyperlinks, SIGIR'01, Sep. 9-12, 2001, New Orleans, Louisiana, USA.

Brian D. Davison, Recognizing Nepotistic Links on the Web, Department of Computer Science Rutgers, The State University of New Jersey.

Erzsebet Ravasz and Albert-Laszlo Barabasi, Hierarchical Organization in Complex Networks, © 2003 The American Physical Society, Published Feb. 14, 2003, Physical Review E 67 026112-1-026112-7.

Gary William Flake, Steve Lawrence, C. Lee Giles, Frans M. Coetzee, Self-Organization and Identification of Web Communities, IEEE Computer, 35(3), 66-71, 2002.

Taher H. Haveliwala, Topic- Sensitive PageRank, WWW2002, May 7-11, 2002, Honolulu, Hawaii, USA.

Jon M. Kleinberg, Authoritative Sources in a Hyperlinked Environment, Journal of the ACM, vol. 46, No. 5, Sep. 1999, pp. 604-632.

Danica Vukadinovic, Polly Huang, Thomas Erlebach, A Spectral Analysis of the Internet Topology, ETH TIK-NR 118, Jul. 2001, Computer Engineering and Networks Laboratory (TIK), Swiss Federal Institute of Technology (ETH), Zurich, Switzerland.

The PageRank Citation Ranking: Bringing Order to the Web, Jan. 29, 1998.

Nadav Eiron and Kevin S. McCurley, Locality, Hierarchy, and Bidirectionality in the Web, IBM Almaden Research Center, Extended abstract for WAW 2003.

Craig Silverstein, Monika Henzinger, Hannes Marais, and Michael Moricz, Analysis of a Very Large Alta vista Query Log, Copyright © Digital Equipment Corporation 1998, Oct. 26, 1998.

Sepandar D. Kamvar, Taher H. Haveliwala, Christopher D. Manning, and Gene H. Golub, Exploiting the Block Structure of the Web for Computing PageRank, Stanford University Copyright © 2003.

David Hawking, Overview of the TREC-9 Web Track, CSIRO Mathematical and Information Sciences, Canberra, Australia, Sep. 4, 2001.

Junghoo Cho and Sourashis Roy, Impact of Search Engines on Page Popularity, WWW 2004, May 17-22, 2004, New York, NY USA.

European Patent Office, "European Search Report", for European Patent Application No. 05 109 532.1, Mar. 8, 2006, Munich.

Kamvar S.D. et al., "Exploiting the Block Structure of the Web for Computing PageRank", Stanford University, Mar. 4, 2003.

Rogers et al., "The Google Pagerank Algorithm and How it Works", 'Online! Jul. 21, 2004, retrieved from the Internet: www.iprcom.com/papers/pagerank/index; retrieved on Oct. 27, 2005, pp. 6-16.

* cited by examiner

WEB PAGE RANKING WITH HIERARCHICAL CONSIDERATIONS

BACKGROUND OF THE INVENTION

In the World Wide Web, information and resources are typically organized as Web pages. To locate desired information and resources on the Web, a user typically employs a search engine to search for relevant Web pages. Typically, a search engine searches a database that contains content-based information about pages on the Web. This content-based information is usually gathered by Web crawlers that periodically browse through the Web in a systematic manner. When a search engine receives a query with certain search terms, the search engine searches a Web information database, looking for Web pages with content-based similarity to the search terms. The search engine then returns the addresses of these Web pages to the user.

As the Web continues to grow, it becomes increasingly challenging for users to accurately locate pages on the Web. For example, a query may result in an unreasonably large number of Web pages where many of these pages are not relevant to the query. Some existing search engines attempt to alleviate this problem by presenting the search results to the user in an order that is based on the importance of the Web pages returned by the search. In the database used by these existing search engines, each Web page is ranked according to hyperlinks that point to that Web page in all of the other Web pages in the database. In other words, a hyperlink pointing to a Web page serves as a vote for that page. Each Web page is ranked according to the number of votes received by the page.

Although search engines that return ranked Web pages produce a better user experience, these search engines also have some serious shortcomings. For example, since most pages on the Web have very few hyperlinks or no hyperlink pointing to them, ranking Web pages based on hyperlinks produces a polarized and unrealistic distribution of importance. Also, since new hyperlinks have to be authored into Web pages, which require a significant amount of time, new pages may not receive the rankings that reflect their importance.

Thus, there is a need for a search engine that is capable of distributing the importance of Web pages in a realistic manner and more accurately accounting for new pages on the Web.

SUMMARY OF THE INVENTION

The described systems, methods and data structures are directed to ranking Web pages with hierarchical considerations. The hierarchical structures and the linking relationships of the World Wide Web are used to provide a page importance ranking for Web searches. The linking relationships are aggregated to a high level node at each of the hierarchical structures. A link graph analysis is performed on the aggregated linking relationships to determine the importance of each node. The importance of each node may be propagated to pages associated with that node. For each page, the importance of that page and the importance of the node associated with the page are used to calculate the page importance ranking.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
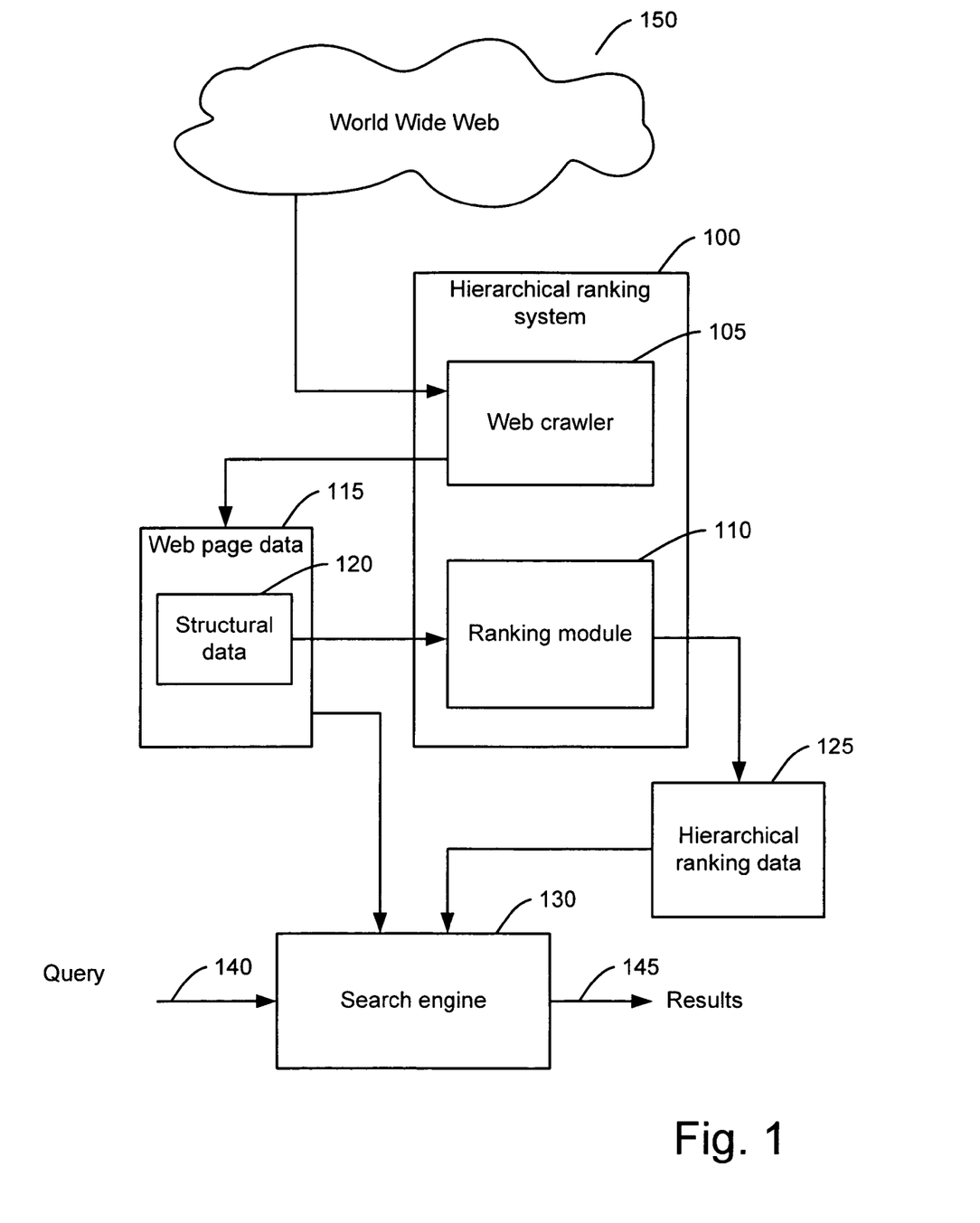
FIG. 1 shows an example hierarchical ranking system for ranking Web pages with hierarchical considerations.

FIG. 1 shows an example hierarchical ranking system 100 for ranking Web pages with hierarchical considerations. In the most basic configuration, system 100 may include Web crawler 105 and ranking module 110. As shown in FIG. 1, system 100 may be configured to provide data to search engine 130, which may be configured to use the data provided by system 100 to respond to queries.

World Wide Web (Web) 150 is a system of Internet servers that support documents that are formatted with a common standard, such as Hyper-Text Markup Language (HTML). These formatted documents, also know as Web pages, may include any type of content, such as hypertext, images, audio or video data, graphics, or the like. A Web page typically includes links (i.e. hyperlinks) to other Web pages.

Web crawler 105 is a logical component configured to search the Web and gather data about pages on the Web 150. Web crawler 105 can use any type of techniques to find and collect any information about Web pages. For example, Web crawler 105 may follow links in a Web page to discover other Web pages, and links in these other Web pages to find more Web pages. Web crawler 105 may continuously perform this searching method to develop a database of information about pages on the Web, such as Web page data 115.

Web page data 115 may include any type of data associated with the pages on the Web. For example, data for a Web page may include keywords, metadata, summary of the content, or the like. Web page data 115 may also include structural data 120 associated with the Web pages. Structure data 120 includes information about how the Web pages are organized on the Web. For example, structural data 120 may include the level of each Web page in a hierarchical structure. The level may be determined from a locator associated with the Web page, such as a Uniform Resource Locator (URL), a file path, or the like. A typically hierarchical structure represented by a URL is illustrated in Table 1 below.

TABLE 1

Hierarchical Structure for "cs.zyxuniversity.edu/research/index.html"

| Level | URL Representations |
|---|---|
| Domain | zyxuniversity.edu |
| Host | cs.zyxuniversity.edu |

TABLE 1-continued

Hierarchical Structure for "cs.zyxuniversity.edu/research/index.html"

| Level | URL Representations |
|---|---|
| Directory | cs.zyxuniversity.edu/research/ |
| Page | cs.zyxuniversity.edu/research/index.html |

Table 1 shows an example hierarchical structure of a Web page associated with a URL of "cs.zyxuniversity.edu/research/index.html". In this example, the Web page associated with this URL is a page in the ZYX University domain and the page is an index of the Research Department website. The hierarchical structure for Web pages may be established in any manner. In one implementation, the top level of the Web hierarchical structure is established from the host, which may be defined as an entity to which a collection of Web pages is affiliated. For example, a host may be a dedicated Web site, such as a public Web site offered by companies, governments, or other entities. A host may also be a part of a community Web site, such as a personal Web site in a service provider's domain. For this implementation, the structure of the URL associated with a Web page may be used to establish the level of that page in the hierarchical structure.

Ranking module 110 is a logical component configured to rank Web pages. Ranking module 110 typically ranks Web pages based on data about the content and the structure associated with the pages, such as Web page data 115 and structural data 120. Ranking module 110 may be configured to determine links within each Web page. A link is an element in a Web page that links to a different Web page. Ranking module 110 may be configured to aggregate the links of the Web pages in Web page data 115 at a certain level. In one implementation, the links are aggregated at the host level. Ranking module 110 may also be configured to calculate weight values for each host based on the aggregated links. Ranking module 110 may further be configured to compute an importance value for each Web page based on the weight value of the host corresponding to the Web page and the characteristics of the Web page within the host hierarchical structure. The importance value for each Web page may be collected in a data store, such as hierarchical ranking data 125.

Search engine 130 is a logical component configured to locate pages on the Web. Search engine 130 may be configured to receive query 140 that includes searching parameters representative of certain content in the desired Web pages. For example, the searching parameters may include keywords, images, media data, or the like. Search engine 130 may also be configured to search Web page data 115 and to determine Web pages that are relevant to the query. Search engine 130 may assign a relevance value to each of the determined Web pages to reflect their relevance to the query. Search engine 130 may also determine an importance value of these determined Web pages from hierarchical ranking data 125. The search engine 130 may then rank the determined Web pages based on the relevance values and the importance values. Ranked results 145 are then provided in response to query 140. Ranked results 145 may be in any format, such as a list of links of the Web pages returned by the search ordered in accordance with their rankings.

Figure 2:
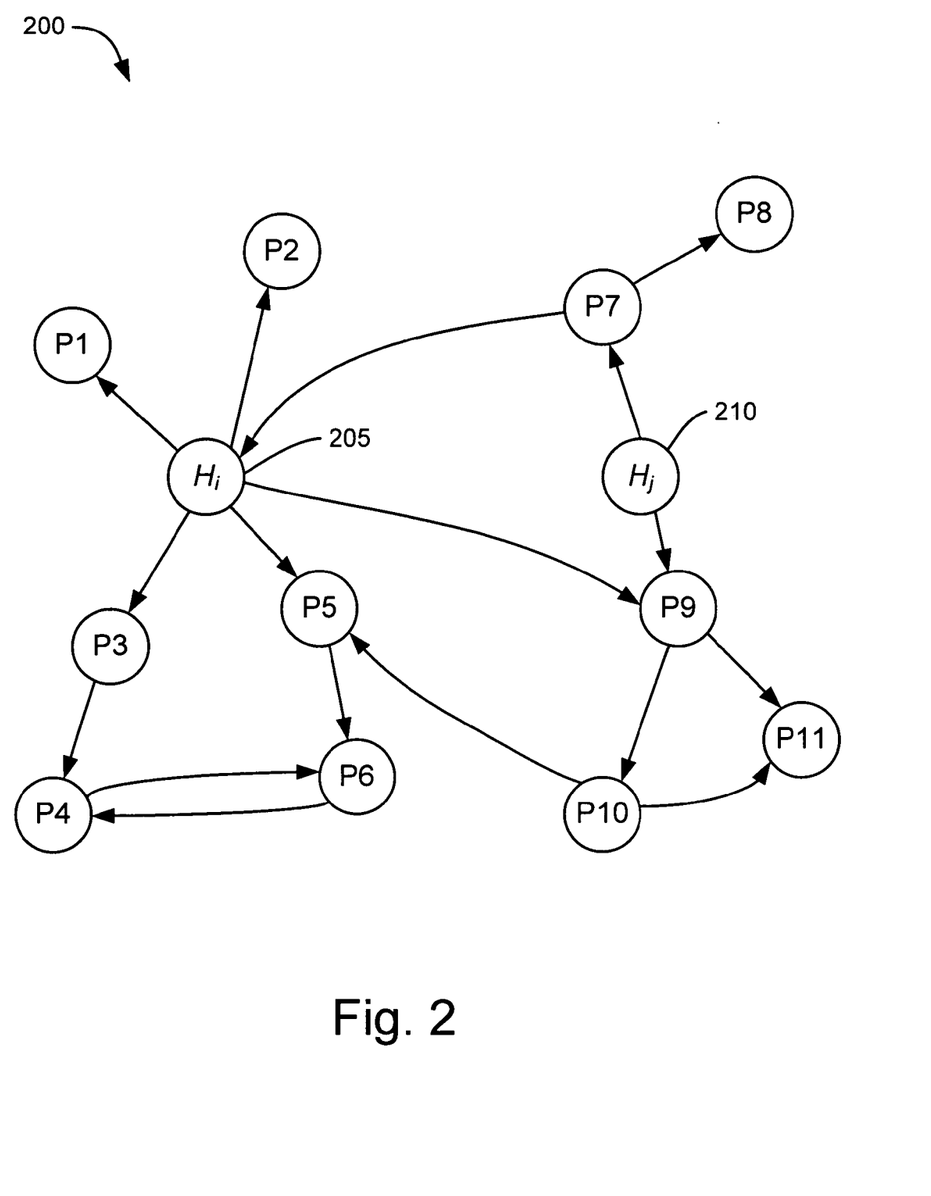
FIG. 2 illustrates an example Web graph that represents Web pages associated with two different hosts.

FIG. 2 illustrates an example Web graph 200 that represents Web pages associated with two different hosts. The hierarchical ranking systems and methods described herein are capable of ranking resources at different levels of granularity. For example, at certain level of granularity, the Web can be viewed as a collection of the hosts that grow more or less independently of each other. For ease of discussion, only host 205 ($H_i$), host 210 ($H_j$), and Web pages P1-P11 are shown in FIG. 2. However, it is to be appreciated that the entire Web may be represented by a Web graph, such as Web graph 200. Web graph 200 may be detected by any learning algorithm, such as the one used by Web crawler 105 shown in FIG. 1.

As shown in FIG. 2, Web pages P1-P6 are associated with host $H_i$ and Web pages P7-P11 are associated with host $H_j$. Each Web page may be associated with other Web pages by links. Some of the Web pages, such as Web page P4, are only linked to other Web pages within its host (i.e. host $H_i$). These links are referred herein as intra-links. Some of the Web pages are linked to Web pages that are not within its host. For example, P5, which is associated with host $H_i$, is linked to P10, which is associated with host $H_j$. Links between Web pages of two different hosts are referred herein as inter-links.

Figure 3:
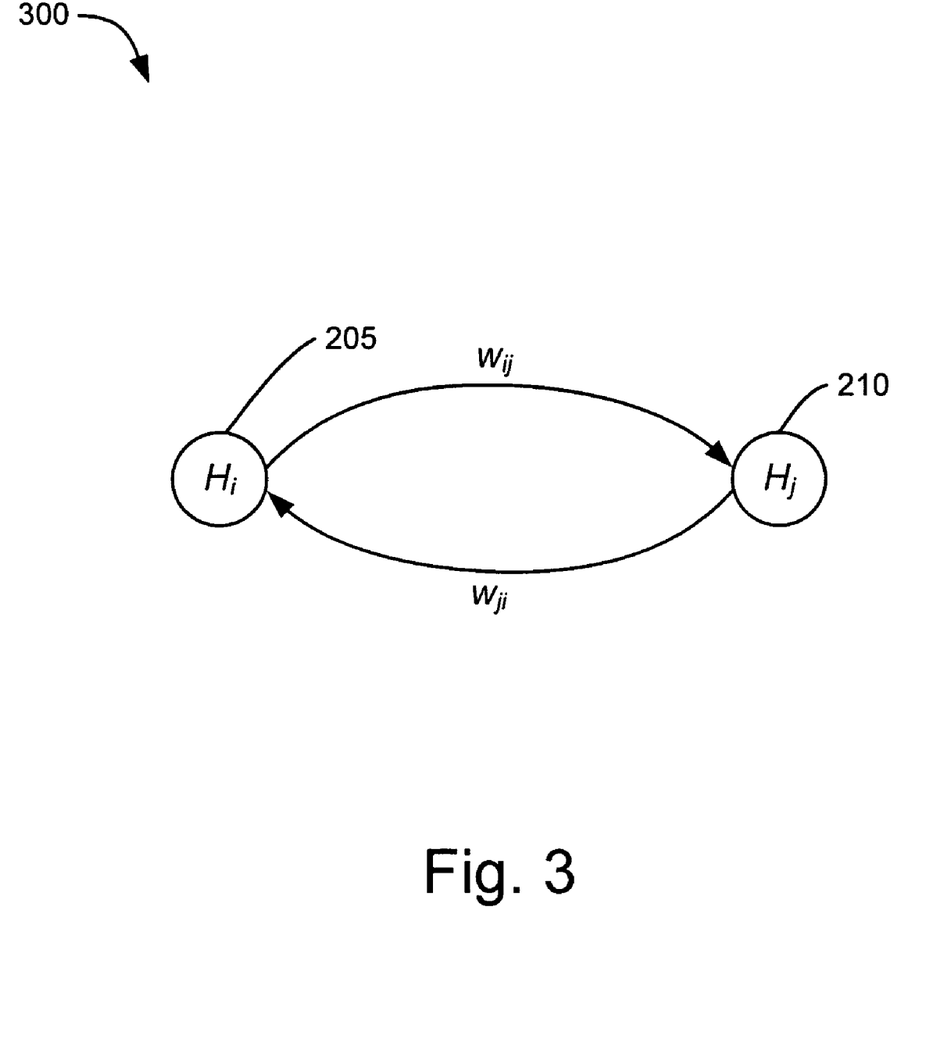
FIG. 3 illustrates an example host graph that is derived from the Web graph shown in FIG. 2.

FIG. 3 illustrates an example host graph 300 that is derived from Web graph 200 shown in FIG. 2. Host graph 300 represents the linking relationships among hosts. In accordance with the described systems and methods, the inter-links illustrated in a Web graph may be aggregated at the host level. For example, the Web graph 200 may be partitioned into host $H_i$ and host $H_j$ so that all of the inter-links are aggregated into the two hosts, respectively. Links within each host may not be taken into account. Weight values $w_{ij}$ and $w_{ji}$ represent numbers of aggregated inter-links in Web pages associated with host $H_i$ and host $H_j$. As shown in FIG. 3, weight value $w_{ij}$ represents the aggregated links in the Web pages of host $H_i$ that point to host $H_j$; weight value $w_{ji}$ represents the aggregated links in the Web pages of host $H_j$ that point to host $H_i$. Accordingly, a host graph, such as host graph 300, may be generally represented as:

$$G' = (V', E') \qquad (1)$$

where G' is a weighted directed graph; V' represents the hosts; and E' encompasses the links between the hosts. Each link $l_{ij} \in E'$ may be associated with a weight value $w_{ij}$ that denoting the weight of host $H_j$ to host $H_i$ where the weight is calculated according to the links between the hosts.

It is to be appreciated that by aggregating the links in a Web graph at the host level, the link density of the resulting host graph is much higher. According to one source of information, the density of links per the host is about 136 in a host graph while a per-page link density is about 7.18 in a Web graph. Higher link density typically yields better ranking results.

After obtaining a host graph, a link analysis algorithm may be applied to calculate the importance of the hosts. A matrix may be constructed to describe the host graph. For example, assuming that the host graph contains m hosts, an adjacency matrix A with a dimension of m×m may be used to represent the host graph. Each of the entries A[i,j] may represent the weight of the links $l_{ij}$. The adjacency matrix may be used to compute the rank score of each host. In one form, the rank score $HI_i$ of host $H_i$ may be evaluated by a function of the rank scores of all of the hosts that point to host $H_i$:

$$HI_i = \sum_{j: l_{j,i} \in E} HI_j \cdot A[j, i] \qquad (2)$$

This recursive definition may give each host a fraction of the link value of each other host pointing to it. For example, the link value may be inversely weighed by the strength of the links of that host. Equation 2 discussed above may be written in the form of a matrix as:

$$\vec{HI} = A\vec{HI} \quad (3)$$

However, in practice, many hosts may have no inter-links (e.g. the weight of the host is 0). The eigenvector of the above equation may be mostly zero. Therefore, the basic model is modified to obtain an "actual model" using random walk. For example, upon browsing a host, with the probability 1-ε, a user randomly chooses one of the links on the current host and jumps to another host to which the current host links. Also, with the probability ε, the user may "reset" by jumping to another host picked at random where the other host is not associated with any of the links in the current host. The ranking formula may be modified to the following form:

$$HI_i = \frac{\varepsilon}{n} + (1 - \varepsilon) \sum_{j: l_{j,i} \in E} HI_j \cdot A[j, i] \quad (4)$$

or, in matrix form:

$$\vec{HI} = \frac{\varepsilon}{n} \vec{e} + (1 - \varepsilon) A \vec{HI} \quad (5)$$

where $\vec{e}$ is the vector of all 1's; and ε (0<ε<1) represents the random walk probability that a jump from a given host to an arbitrary host randomly occurs. In one implementation, ε may be set to 0.15 to yield good results.

After determining the importance of the host, the importance of the Web pages associated with the host may be calculated according to the reputation and the hierarchical structure of the host. In one implementation, a Web page is assigned the importance of the host to which the Web page belongs. Other factors may also be considered, such as the depth of the path associated with the URL of the Web page, whether the Web page is an index page or a content page, the number of inter-links associated with the Web page, or the like. In deciding which factors to apply, the following considerations may be taken into account:

1) If a host should be ranked high due to a certain reputation, the Web pages in the host may benefit from the host's reputation to some extent. Some observations indicate that many top ranked Web pages are associated with top ranked hosts.

2) If a Web page in a host is linked by the Web pages outside the host, the amount of such inter-links may be reflected in the importance of the Web page.

3) The level of a Web page in a host may be reflected by the importance of the Web page. Typically, in order to let users efficiently find important content in the host, authors generally do not put such important content in a Web page with a long path.

4) If a Web page is the index page, the Web page may be given a higher importance to reflect its usefulness.

Based on the above considerations, several properties may be used to formulate the hierarchical structure of the host as a weighted directed tree structure and to analyze the importance of the Web pages on the tree structure. Generally, the host may be viewed as a parent node and the Web pages as child nodes. A function may be used to represent the weight from the parent node to its child node.

Figure 4:
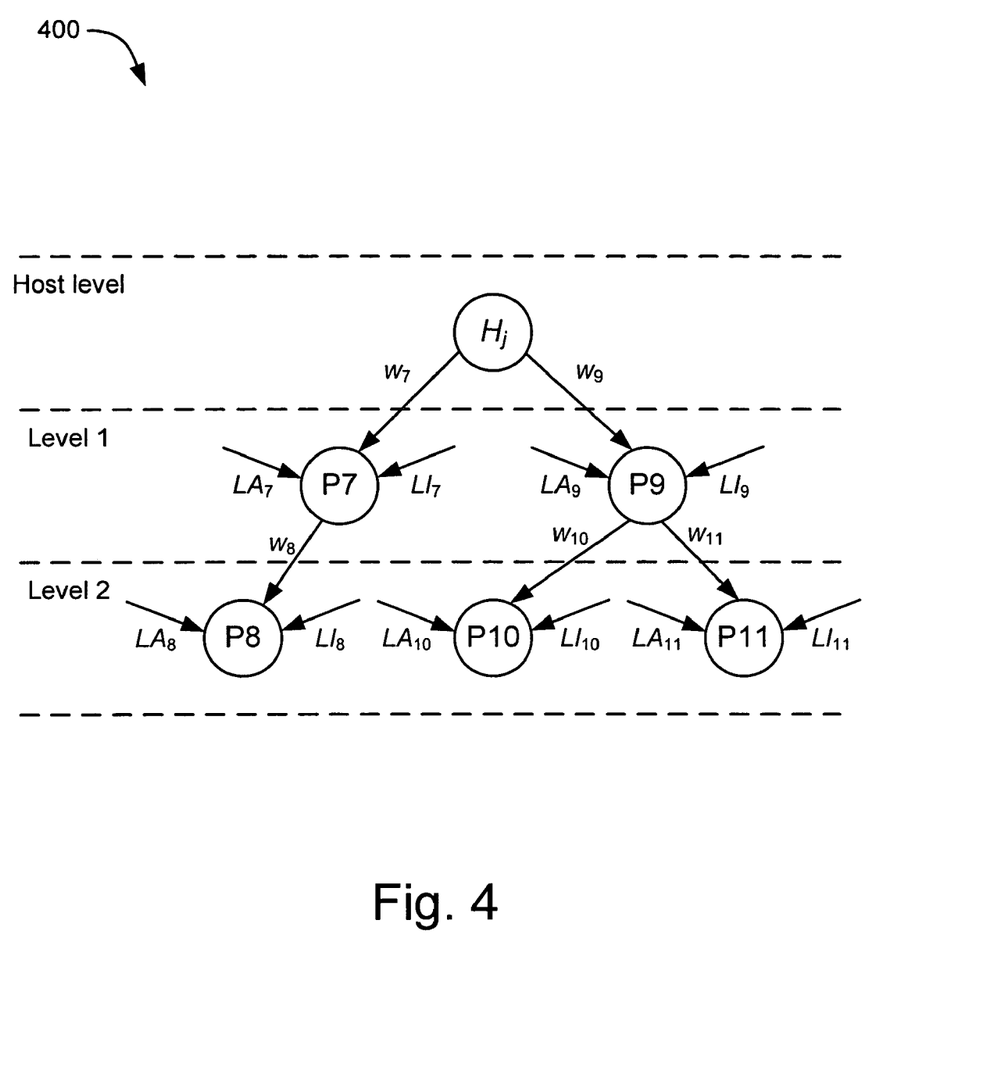
FIG. 4 shows an example hierarchical structure that represents a host and Web pages associated with that host.

FIG. 4 shows an example hierarchical structure 400 that represents a host and Web pages associated with that host. In this example, hierarchical structure 400 is associated with host $H_j$ shown in FIG. 2. Web pages P7-P11 are associated with host $H_j$. As shown in FIG. 4, Web page P7-P11 are associated with weight values $w_7$-$w_{11}$, inter-link value $LI_7$-$LI_{11}$, and intra-link value $LI_7$-$LI_{11}$. Specifically, the inter-link value $LI_i$ represents the number of links pointing to Web page $p_i$ where the links are in other Web pages that are outside the host. The intra-link value $LA_i$ represents the number of links pointing to Web page $p_i$ where the links are in other Web pages that are part of the host.

Generally, given a Web page $p_i$ in a host, the weight w of the page $p_i$ may be calculated as:

$$w(p_i) = \delta \times \text{Link}(p_i) \times \text{Index}(p_i) \quad (6)$$

where Link is a function of the inter-links and intra-links associated with Web page $p_i$; Index is a function of whether Web page $p_i$ is an index page; and δ is a decay factor.

The Link function may be designed to calculate a factor that depends on the number of links pointing to Web page $p_i$ from other Web pages inside or outside the host. The Link function may be configured to distinguish inter-links and intra-links. For example, the Link function may assign different weights to the inter-links and the intra-links according to their relative importance. The Link function may be defined as:

$$\text{Link}(n_i) = \frac{\omega \times LI(n_i) + (1 - \omega) \times LA(n_i)}{\sum_{p_j \in H_j} \omega \times LI(n_j) + (1 - \omega) \times LA(n_j)} \quad (7)$$

where ω is a factor that assigns the relative weight distribution between inter-links and intra-links. For example, in equation (8), a large value of ω (i.e. close to 1) results in the inter-links having more relative the link weight than the intra-links.

The function Index determines whether a Web page is an index page and may be defined as:

$$\text{Index}(p_i) = \begin{cases} \phi_1 & p_i: \text{index page} \\ \phi_2 & p_i: \text{other page} \end{cases} \quad (8)$$

where $\phi_1$ and $\phi_2$ are values that can be assigned to the function depending on whether the Web page is an index page.

Based on the analysis above, a weighted directed tree structure that considers the structure characteristics of the host may be obtained. The importance of each page $p_i$ may be determined based on the hierarchical weighted structure:

$$\text{Imp}(p_i, H_j) = \prod_{p_j} w(p_j) \quad (9)$$

where $p_j$ is the Web page from $p_i$ to its parent Web page and to host $H_j$.

Equation 9 may be calculated recursively from the higher lever Web pages to the lower level Web pages and each Web page may be assigned an important score.

The overall importance PI of the Web page $p_i$ in the whole Web graph may be calculated by:

$$PI(p_i) = HI(H_j) \times \text{Imp}(p_i, H_j) \quad (10)$$

According to Equation 10, if a given host has a high reputation, the Web pages in the host may also have a high reputation. The influence of the host's importance on the overall importance of the Web page may be adjusted by:

$$PI(p_i) = HI(H_j) \times [\alpha + \beta \times Imp(p_i, H_j)] \qquad (11)$$

where $\alpha$ and $\beta$ are weighting parameters.

The Web page importance analysis discussed above may be used in combination with a content-based similarity analysis to rank a list of Web pages in response to a query. This process may be referred to as re-ranking. Any technique may be used to combine the Web page importance analysis and the content-based analysis. For example, a score based re-ranking and an order based re-ranking may be employed to produce good results.

Score based re-ranking uses a linear combination of a content-based similarity score and the Web Page importance score of a Web page. The overall score of a Web page $p_i$ may be determined by:

$$Score(p_i) = \lambda Sim(p_i) + (1 - \lambda)PI(p_i) \qquad (\lambda \in [0, 1]) \qquad (12)$$

where Sim is the content-based similarity between Web page $p_i$ and the query; $\lambda$ is a factor that assigns the relative distribution between Web page importance and content-based similarity. Sim and PI may be represented by values. Because of the different scoring metrics, the Sim and PI values may be normalized into the same scope before calculating the overall score using the linear combination in Equation 12.

Order based re-ranking may be determined based on the rank orders of the Web pages. A linear combination of positions of the Web pages in two lists where one list is sorted by content-based similarity scores the other list is sorted by Web page importance scores. Order based re-ranking may be implemented by:

$$Score(w) = \lambda O_{Sim(pi)} + (1 - \lambda)O_{PI(pi)} \qquad (\lambda \in [0, 1]) \qquad (13)$$

where $O_{Sim}$ and $O_{PI}$ are positions (or orders) of Web page $p_i$ in a similarity score list and an importance score list, respectively.

It is to be appreciated that the technique discussed above is discussed herein in the context of ranking Web pages. However, the technique may be applied to rank any type of data that is organized in a hierarchical structure. For example, any system that can be represented by interconnecting nodes where each node is associated with a level in a hierarchical structure may be ranked using the discussed technique.

Figure 5:
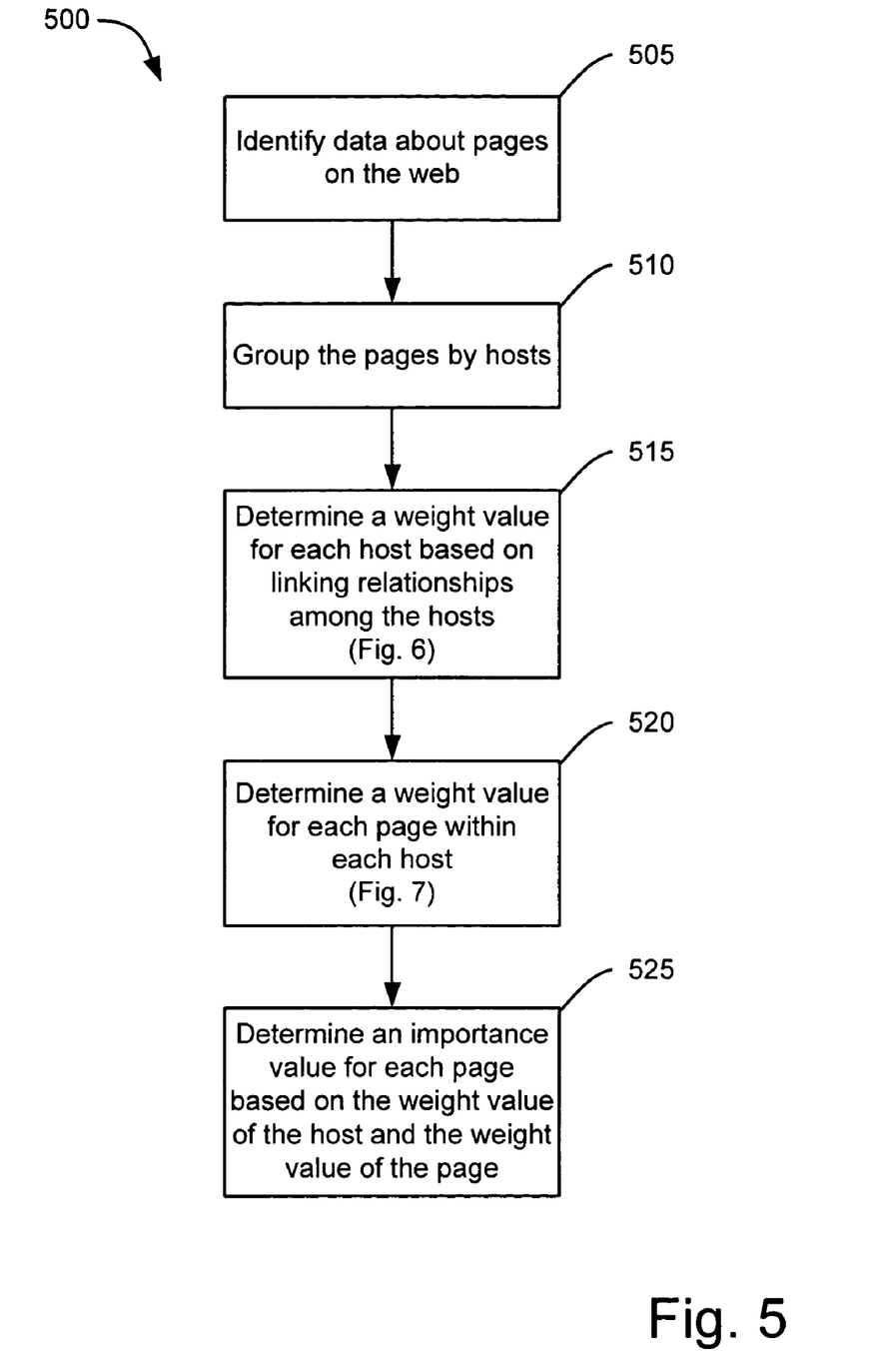
FIG. 5 shows an example process that may be used to determine an importance value for a Web page.

FIG. 5 shows an example process 500 that may be used to determine an importance value for a Web page. Process 500 may be used by a module of a Web searching system, such as ranking module 110 shown in FIG. 1. For discussion purposes, process 500 is discussed in the context of Web pages and hosts. However, process 500 may be applied to nodes in any system organized as a hierarchical structure.

At block 505, data about pages on the Web is identified. The data may be gathered by a Web crawler that detects pages on the Web. The data may be stored in a database for use by a ranking module. The data may include content-based data, such as keywords, metadata, or the like. The data may also include structural data, such as the URL's of the Web pages.

At block 510, the Web pages are grouped in accordance with their corresponding hosts. Typically, each Web page is associated with a host, which may be determined from the URL of the Web page. At block 515, a weight value for each host is determined based on linking relationships among the hosts. An example process for determining a weight value for a host will be discussed in conjunction with FIG. 6. Briefly stated, inter-links (e.g. links in Web pages outside the host pointing to Web pages associated with a host) are aggregated. The aggregated inter-links of each host are used to determine a weight value for the host.

At block 520, a weight value for each page within each host is determined. The weight value of a Web page may be determined based on a weight value associated the inter-links and intra-links of the Web page. The weight value of the Web page may also be based on other factors, such as the level of the Web page in the host, whether the Web page is an index page, or the like. An example process for determining a weight value for a Web page will be discussed in conjunction with FIG. 7.

At block 525, an importance value for each Web page is determined based on the weight value of the host and the weight value of the Web page. The determined weight values may be used by a search engine to rank Web pages returned by a search in response to a query. The determined weight values may also be used to rank pages and the order of the pages may be used by the search engine, instead of the weight values.

Figure 6:
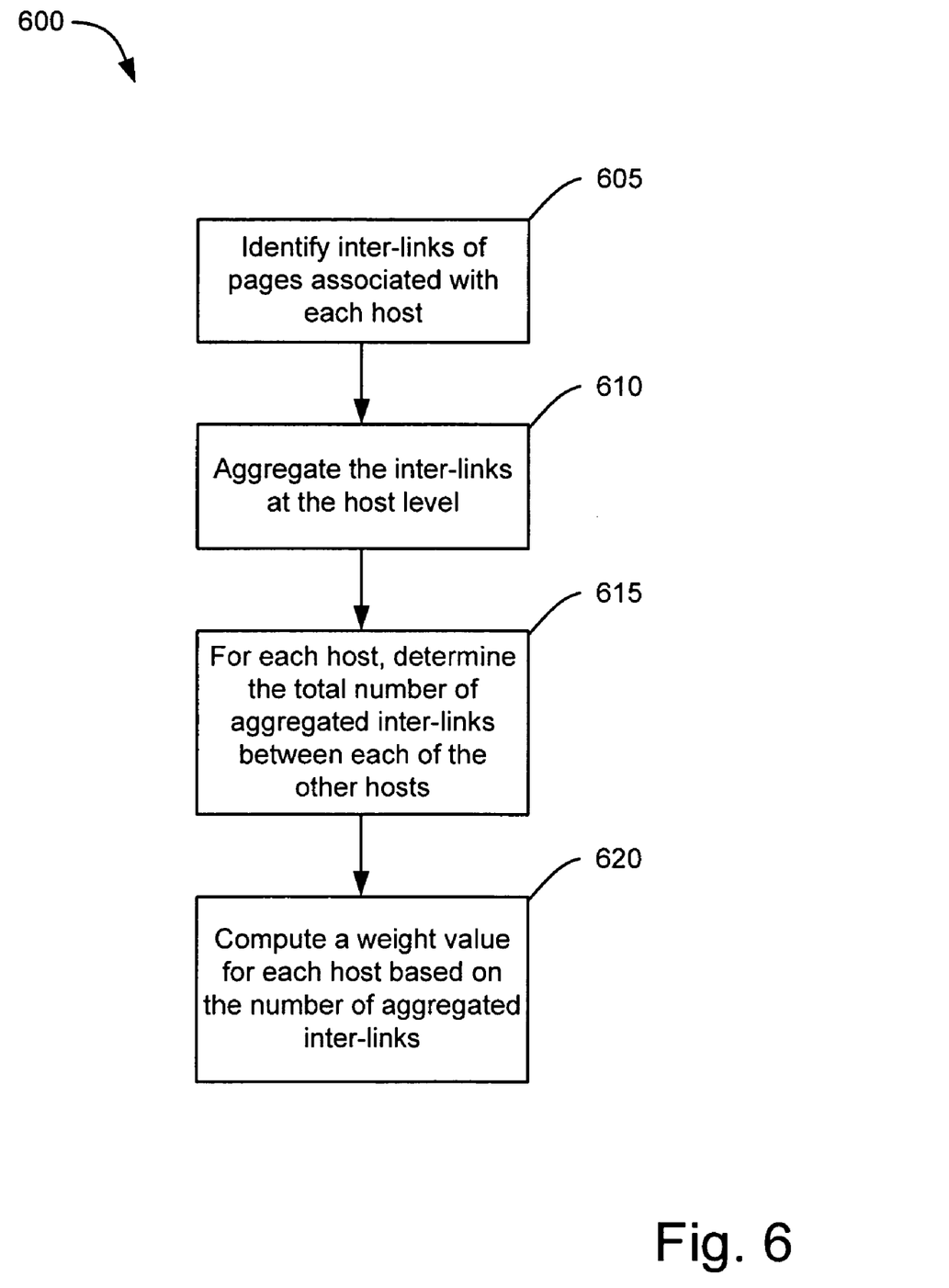
FIG. 6 shows an example process for determining a weight value for a host.

FIG. 6 shows an example process 600 for determining a weight value for a host. At block 605, inter-links of Web pages associated with each host are identified. At block 610, the inter-links are aggregated at the host level. At block 615, for each host, the total number of aggregated inter-links between that host and each of the other hosts are determined. The aggregated inter-links may be represented by a matrix or a data array. At block 620, a weight value for each host may be computed based on the number of aggregated inter-links. The weight value for the hosts may be computed by operating on a matrix representing the aggregated inter-links. For example, such operations may be iteratively computed on a data array representing the matrix.

Figure 7:
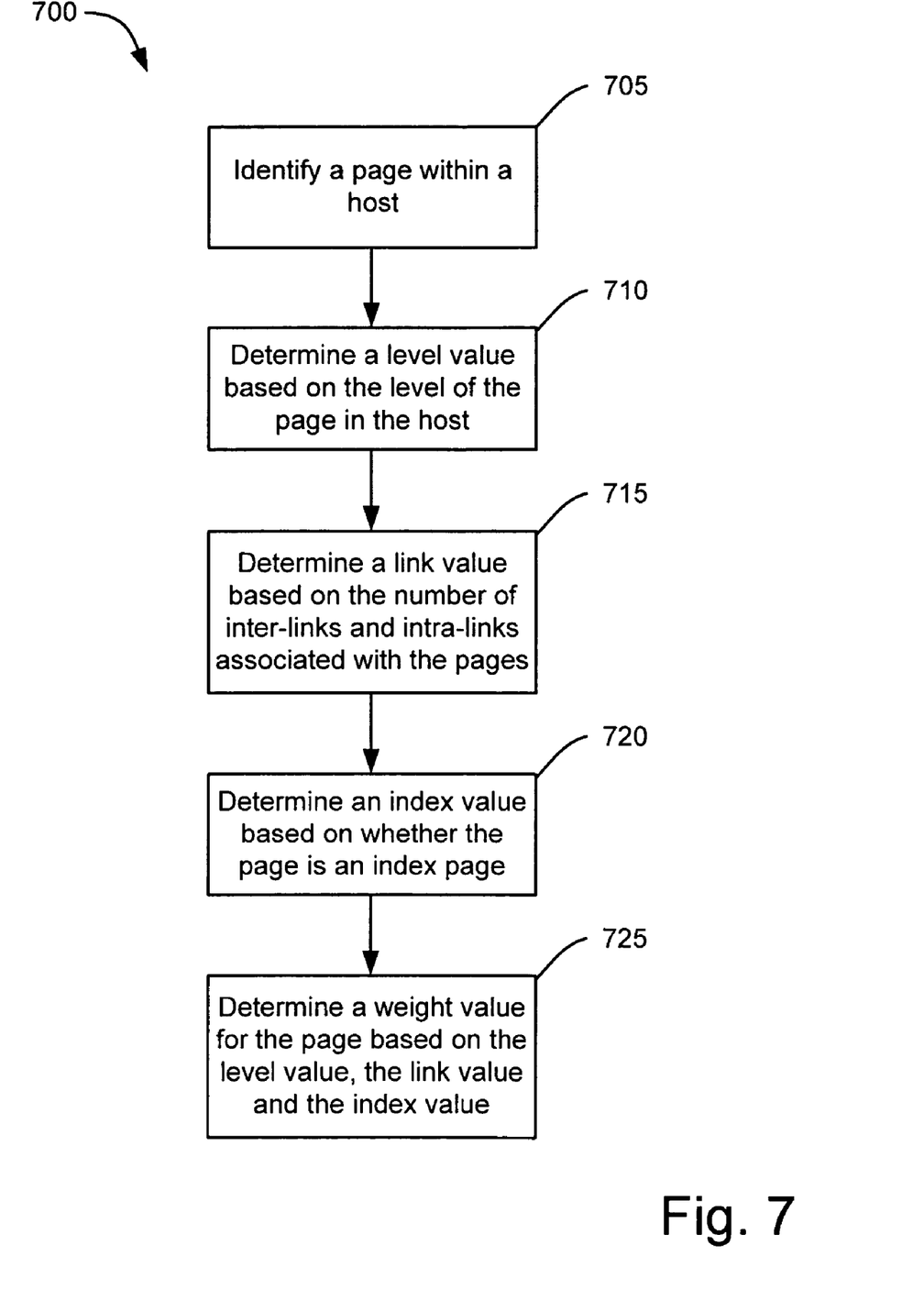
FIG. 7 shows an example process for determining a weight value associated with a Web page.

FIG. 7 shows an example process 700 for determining a weight value associated with a Web page. At block 705, a Web page within a hierarchical structure associated with a host is identified. At block 710, a level value is determined based on the level of the Web page in the host. The level of the Web page may be determined by any method, such as by analyzing the URL of the Web page.

At block 715, a link value is determined based on the number of inter-links and intra-links associated with the Web page. A factor may be used to adjust the relative influence that the inter-links and the intra-links have on the link value. At block 720, an index value is determined based on whether the page is an index page. An index page typically includes an organized set of links and information about the Web pages associated with those links. Typically, an index is useful for navigating a Web site and is typically more important than other Web pages in the site. At block 725, a weight value for the Web page is determined based on the level value, the link value, and the index value.

Figure 8:
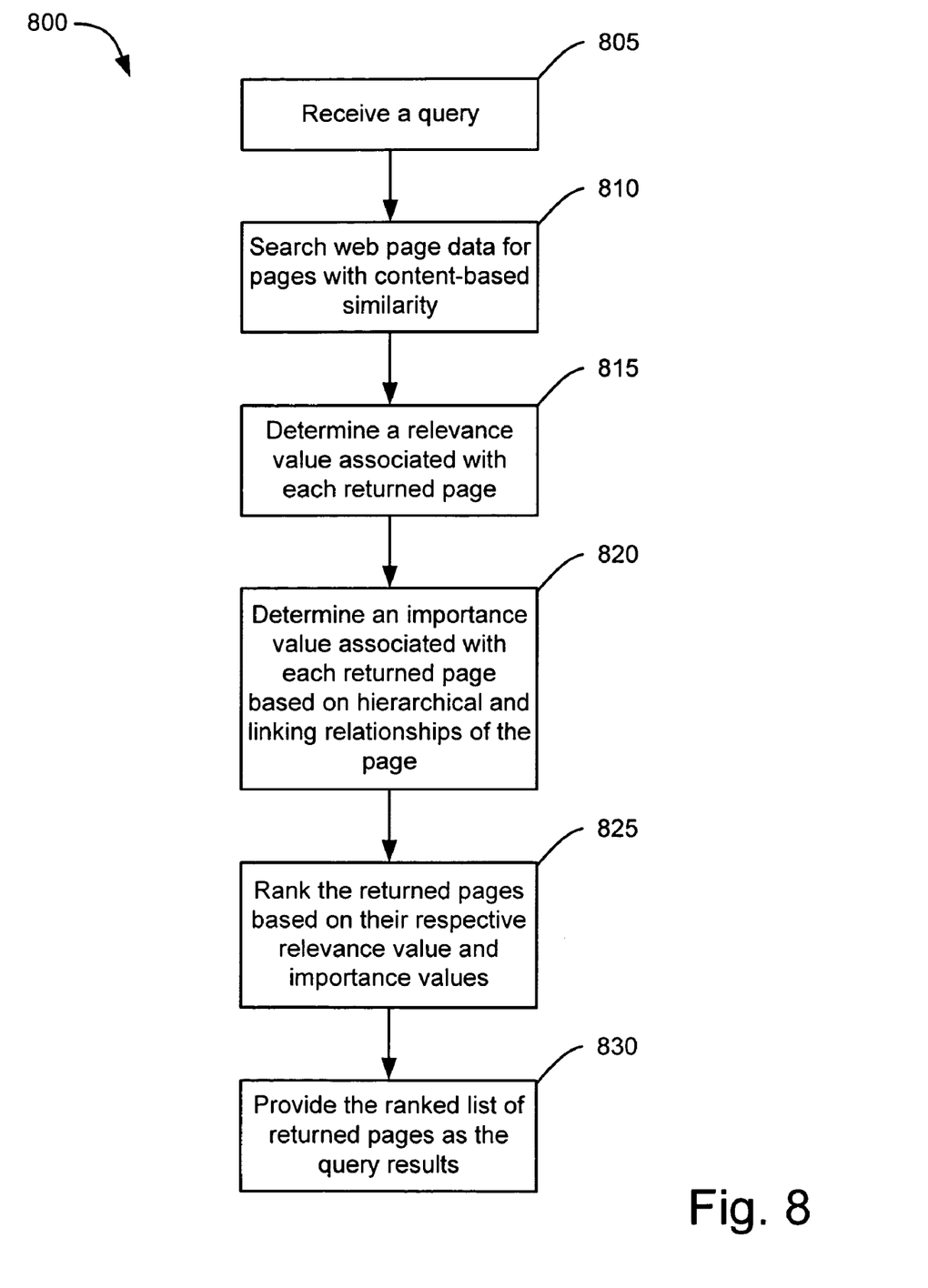
FIG. 8 shows an example process for responding to a query.

FIG. 8 shows an example process 800 for responding to a query. Process 800 may be implemented by a search engine to return a list of links to Web pages that are relevant to the query. At block 805, a query is received. Typically, the query includes terms related to the Web pages that the user is attempting to find.

At block 810, Web page data are searched for Web pages with content-based similarity. Web page data are typically supplied by a Web crawler. At block 815, a relevance value associated with each Web page returned by the search is determined. At block 820, an importance value associated with each returned Web page is determined. The importance value may be determined based on hierarchical and linking relationships of the Web page. The importance value for each Web page referenced in the Web page data may be determined by a ranking module.

At block 825, the returned Web pages are ranked based on their respective relevance values and importance values. At block 830, the ranked list of links to the returned Web pages is provided as the query results.

Figure 9:
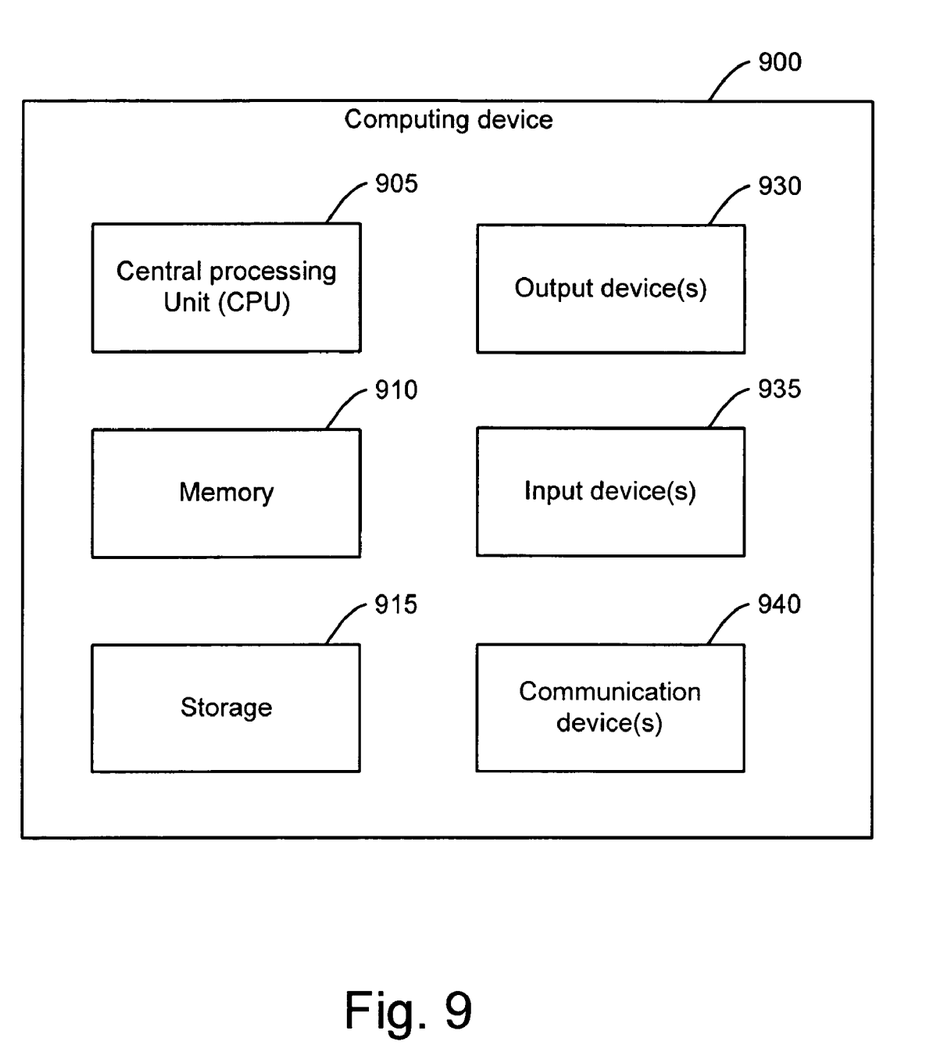
FIG. 9 shows an exemplary computer device for implementing the described systems and methods.

FIG. 9 shows an exemplary computer device 900 for implementing the described systems and methods. In its most basic configuration, computing device 900 typically includes at least one central processing unit (CPU) 905 and memory 910.

Depending on the exact configuration and type of computing device, memory 910 may be volatile (such as RAM), non-volatile (such as ROM, flash memory, etc.) or some combination of the two. Additionally, computing device 900 may also have additional features/functionality. For example, computing device 900 may include multiple CPU's. The described methods may be executed in any manner by any processing unit in computing device 900. For example, the described process may be executed by both multiple CPU's in parallel.

Computing device 900 may also include additional storage (removable and/or non-removable) including, but not limited to, magnetic or optical disks or tape. Such additional storage is illustrated in FIG. 9 by storage 915. Computer storage media includes volatile and nonvolatile, removable and non-removable media implemented in any method or technology for storage of information such as computer readable instructions, data structures, program modules or other data. Memory 910 and storage 915 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 900. Any such computer storage media may be part of computing device 900.

Computing device 900 may also contain communications device(s) 940 that allow the device to communicate with other devices. Communications device(s) 940 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 900 may also have input device(s) 935 such as keyboard, mouse, pen, voice input device, touch input device, etc. Output device(s) 930 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. A method of evaluating content on the Web comprising:
identifying a plurality of pages on the Web;
identifying a plurality of nodes, each node associated with a hierarchical structure to which at least one of the pages corresponds;
grouping the plurality of pages to the corresponding nodes;
for each node, determining a first value based, at least in part, on the linking relationships between that node and the other nodes;
for each page, determining a unique second value based, at least in part, on characteristics of that page, wherein the characteristics of that page includes a level value representing a hierarchical level of that page within the hierarchical structure of the corresponding node to which the page corresponds, wherein the unique second value is uniquely determined for each page based on the level value;
for each node, identifying inter-links of pages corresponding to the node, wherein the inter-links represent links that point to the pages corresponding to the node and that are included in other pages corresponding to other nodes;
aggregating the identified inter-links;
determining a third value based, at least in part, on the total number of aggregated inter-links and as a variable that represents a relative weight distribution between the identified inter-links and intra-links for the node, such that the relative weight distribution represents an inverse relationship between the weight of the identified inter-links and the weight of the intra-links for the node, a predetermined value of the variable would indicate that inter-links having more relative link weight than the intra-links;
determining the first value for the node based, at least in part, on the third value; and
determining, storing an importance value and outputting for each page based, at least in part, on the unique second value associated with that page and the first value associated with the node to which the page corresponds and a reputation value, wherein the reputation value is an indication of the influence of host's importance on the overall importance of the page.

2. The method as recited in claim 1, wherein the nodes include at least one of hosts, domains, or index pages.

3. The method as recited in claim 1, further comprising:
representing the plurality of third values as a matrix; and
operating on the matrix to compute the plurality of first values for the nodes.

4. The method as recited in claim 3, wherein the matrix is represented by a data array and wherein the plurality of first values are iteratively computed from the data array.

5. The method as recited in claim 1, wherein the level of the page is represented by a Uniform Resource Locator (URL) associated with the page.

6. The method as recited in claim 1, wherein the characteristics further include the number of inter-links and intra-links associated with the page, wherein the intra-links represent links that point to the page corresponding to a particular node and that are included in pages corresponding to the particular node, and wherein the inter-links represent links that point to the page and that are included in other pages corresponding to other nodes.

7. The method as recited in claim 1, wherein the characteristics include whether the page is an index page.

8. The method as recited in claim 1, further comprising:
   receiving a query;
   searching for pages having similarity with the query; and
   for each page returned by searching, determining a relevance value based, at least in part, on a similarity between the page and the query.

9. The method as recited in claim 8, further comprising:
   ranking each returned page based, at least in part, on the relevance value and the importance value associated with the page; and
   providing a list of links associated with the returned pages in response to the query, wherein the links are ranked on the list based, at least in part, on an order in which the returned pages are ranked.

10. A system comprising:
   a data store containing data about pages on the Web, the data for each page indicating characteristics of the page and a host to which the page corresponds; and
   a computer comprising a ranking module configured to determine links pointing to each of the pages from the data in the data store, the ranking module also configured to aggregate the links associated with each host and to calculate a weight value for the host based on the aggregated links such that the weight value is a function of, at least in part, on the total number of aggregated inter-links and as a variable that represents a relative weight distribution between the identified inter-links and intra-links for the node, such that the relative weight distribution represents an inverse relationship between the weight of the identified inter-links and the weight of the intra-links for the node, a predetermined value of the variable would indicate that inter-links having more relative link weight than the intra-links, the ranking module further configured to compute and store a unique importance value for each page based, at least in part, on the weight value of the host corresponding to the page and the characteristics of the page,
   wherein the unique importance value of each page is calculated at least partly based on a hierarchical level value of that page representing a hierarchical level within a hierarchical structure associated with the corresponding host, wherein the unique importance value is uniquely determined for each page and the unique importance value is also a function of a reputation of the host to which the page corresponds and outputting the importance value.

11. The system as recited in claim 10, wherein the characteristics of the page further include at least one of links pointing to the page, or whether the page is an index page.

12. The system as recited in claim 10, further comprising:
   a search engine configured to respond to a query for desired pages on the Web, the query including parameters representative of content in the desired pages, the search engine also configured to return pages that are relevant to the query and to assign a relevance value to each of the returned pages, the search engine further configured to identify the importance value of each of the returned pages from the ranking module.

13. The system as recited in claim 12, wherein the search engine is further configured to rank each of the returned pages based, at least in part, on the relevance value and the importance value associated with the page and to return a list of links of the returned pages wherein the links are ordered in the link according with the rankings associated with the returned pages.

14. The system as recited in claim 10, further comprising a Web crawler configured to search the Web and to provide the data about the pages contained in the data store.

15. The system as recited in claim 14, wherein the Web crawler is further configured to provide the data about the pages as a searchable database.

16. An apparatus comprising:
   means for gathering data about pages on the Web;
   means for determining hosts to which the pages correspond;
   means for determining an importance of each host at least in part, on a hierarchical random walk analysis;
   means for determining an importance of each page;
   means for ranking each page based, at least in part, on the importance of the page and the importance of the corresponding host, a reputation of the page and a reputation of the host, wherein the reputation value is an indication of the influence of host's importance on the overall importance of the page, and
   means for storing a ranking of each page,
   wherein the means for determining the importance of each page uses a hierarchical level value representing the hierarchical level of that page within a hierarchical structure associated with the corresponding host to which that page corresponds, wherein the importance of each page is uniquely determined,
   means for aggregating linking relationships of the pages at each host;
   means for calculating a weight value for the corresponding host to which that page corresponds, based on the aggregated links such that the weight value is a function of, at least in part, on the total number of aggregated inter-links and as a variable that represents a relative weight distribution between the identified inter-links and intra-links for the node, such that the relative weight distribution represents an inverse relationship between the weight of the identified inter-links and the weight of the intra-links for the node, a predetermined value of the variable would indicate that inter-links having more relative link weight than the intra-links,
   means for determining the importance of each host based, at least in part, on the aggregated linking relationships associated with the host;
   wherein the means for determining the importance of each page determines and outputs the importance of the page based on whether the page is an index page or a content page.

17. The apparatus as recited in claim 16, further comprising means for propagating the importance of a host to each page corresponding to the host.

18. The apparatus as recited in claim 16, further comprising means for determining the aggregated linking relationships associated with the host based, at least in part, on inter-links pointing to the pages associated with the host.

19. The apparatus as recited in claim 16, further comprising means for determining the importance of each page based, at least in part, on characteristics associated with the page.

20. The apparatus as recited in claim 19, further comprising means for determining the characteristics of each page based, at least in part, on the inter-links and intra-links pointing to the page.

21. The apparatus as recited in claim 16, further comprising:
- means for performing a search in response to a query;
- means for returning pages that are relevant to the query; and
- means for ranking each returned page based, at least in part, on the relevance of the page to the query.

22. The apparatus as recited in claim 21, further comprising:
- means for determining the importance for each returned page; and
- means for re-ranking each returned page based, at least in part, on the importance of the page.

23. The apparatus as recited in claim 22, further comprising:
- means for determining a list of links associated with the returned page;
- means for arranging the links in the list in accordance to the re-ranking order of the returned page; and
- means for providing the list of re-ranked links as results for the query.

* * * * *